United States Patent
Shim et al.

(10) Patent No.: US 8,784,259 B2
(45) Date of Patent: Jul. 22, 2014

(54) TRANSMISSION FOR VEHICLE

(75) Inventors: Hyu Tae Shim, Hwaseong-si (KR); Kang Soo Seo, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 231 days.

(21) Appl. No.: 13/323,443

(22) Filed: Dec. 12, 2011

(65) Prior Publication Data

US 2013/0072343 A1   Mar. 21, 2013

(30) Foreign Application Priority Data

Sep. 21, 2011   (KR) .................. 10-2011-0095035

(51) Int. Cl.
*F16H 3/66*   (2006.01)
(52) U.S. Cl.
USPC .......................................... 475/281; 475/330
(58) Field of Classification Search
USPC .................. 475/271, 285–292, 296–297, 330
See application file for complete search history.

(56) References Cited

U.S. PATENT DOCUMENTS

| | | | |
|---|---|---|---|
| 4,683,776 A | 8/1987 | Klemen | |
| 7,285,069 B2 * | 10/2007 | Klemen | 475/275 |
| 7,976,425 B2 * | 7/2011 | Wittkopp et al. | 475/284 |
| 8,187,139 B2 * | 5/2012 | Baldwin | 475/286 |
| 8,197,376 B2 * | 6/2012 | Gumpoltsberger et al. | 475/280 |
| 8,303,454 B1 * | 11/2012 | Shim et al. | 475/280 |
| 2008/0039266 A1 * | 2/2008 | Shim | 475/280 |
| 2008/0103015 A1 * | 5/2008 | Seo | 475/280 |
| 2011/0045943 A1 | 2/2011 | Gumpoltsberger et al. | |

FOREIGN PATENT DOCUMENTS

| | | |
|---|---|---|
| KR | 10-2007-0077869 A | 7/2007 |
| KR | 10-2009-0045663 A | 5/2009 |
| KR | 10-2010-0097706 | 9/2010 |

* cited by examiner

*Primary Examiner* — Roger Pang
(74) *Attorney, Agent, or Firm* — Morgan, Lewis & Bockius LLP

(57) ABSTRACT

A transmission for a vehicle employs parts as few as possible to provide forward 11-speed and reverse 3-speed gear ratios along with relatively simple configuration, thereby allowing the operational state of an engine connected thereto to achieve an optimal state. Thus, the transmission makes it possible to improve fuel efficiency and to secure smooth driving performance of the vehicle.

9 Claims, 2 Drawing Sheets

|  | CL1 | CL2 | CL3 | CL4 | B1 | B2 | B3 | F1 |
|---|---|---|---|---|---|---|---|---|
| 1st |  |  |  | ● | ● |  | ● | ○ |
| 2nd |  | ● |  |  | ● |  | ● |  |
| 3rd |  | ● |  | ● | ● |  |  |  |
| 4th |  | ● |  |  | ● | ● |  |  |
| 5th | ● | ● |  |  | ● |  |  |  |
| 6th | ● | ● |  |  |  |  |  |  |
| 7th |  | ● | ● | ● |  |  |  |  |
| 8th | ● |  | ● |  | ● |  |  |  |
| 9th | ● |  | ● |  |  | ● |  |  |
| 10th |  |  | ● |  | ● | ● |  |  |
| 11th |  |  | ● | ● | ● |  |  |  |
| Rev1 | ● |  |  |  | ● |  | ● |  |
| Rev2 | ● |  |  |  |  | ● | ● |  |
| Rev3 | ● |  |  | ● |  |  | ● |  |

TRANSMISSION FOR VEHICLE

CROSS-REFERENCE TO RELATED APPLICATION

The present application claims priority of Korean Patent Application Number 10-2011-0095035 filed Sep. 21, 2011, the entire contents of which application is incorporated herein for all purposes by this reference.

BACKGROUND OF INVENTION

1. Field of Invention

The present invention relates, in general, to a transmission for a vehicle, and, more particularly, to a structure of a transmission for a vehicle, capable of realizing forward 11-speed and reverse 3-speed gear ratios.

2. Description of Related Art

Vehicles are equipped with a transmission so as to able to supply power generated from a power source such as an engine to drive wheels at the proper rotational speed and torque converted depending on a driving condition.

Such a transmission generally provides a plurality of gear ratios from a maximum gear ratio for meeting maximum hill-climbing capability to a minimum gear ratio for obtaining the highest speed of the vehicle. In theory, the greater the number of gear ratios, the more advantageous it is for securing the optimum driving point of the engine, so that it is possible to contribute to improving the fuel efficiency of the vehicle.

For reference, Korean Unexamined Patent Application Publication No. 10-2010-0097706, discloses a structure of a transmission capable of realizing forward 10-speed and reverse 2-speed gear ratios.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a transmission for a vehicle, which employs as few parts as possible and provides forward 11-speed and reverse 1-speed gear ratios along with a relatively simple configuration, thereby allowing the state of operation of an engine connected thereto to be the optimal state. Thus, the transmission makes it possible to improve fuel efficiency and to secure smooth driving performance of the vehicle.

Various aspects of the present invention provide for a transmission for a vehicle, which includes a first compound planetary gear train in which a first planetary gear train and a second planetary gear train are coupled to each other, a second compound planetary gear train in which a third planetary gear train and a fourth planetary gear train are coupled to each other and at least one rotational element thereof is connected with a rotational element of the first compound planetary gear train, an input shaft which is connected to rotational elements of the first compound planetary gear train by at least two paths and is connected to rotational elements of the second compound planetary gear train by at least two paths, an output shaft which is connected to one rotational element of the second compound planetary gear train, first and second brakes, each of which locks the rotational elements of the first compound planetary gear train, a third brake which locks the rotational element of the second compound planetary gear train, and a first clutch which selectively connects the rotational elements of the first and second planetary gear trains to each other.

According to the present invention, the transmission employs as few parts as possible to provide forward 11-speed and reverse 1-speed gear ratios while having a relatively simple configuration, thereby allowing the state of operation of an engine connected thereto to be the optimal state. Thus, the transmission makes it possible to improve fuel efficiency and to secure smooth driving performance of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE INVENTION

Figures 1, 2:
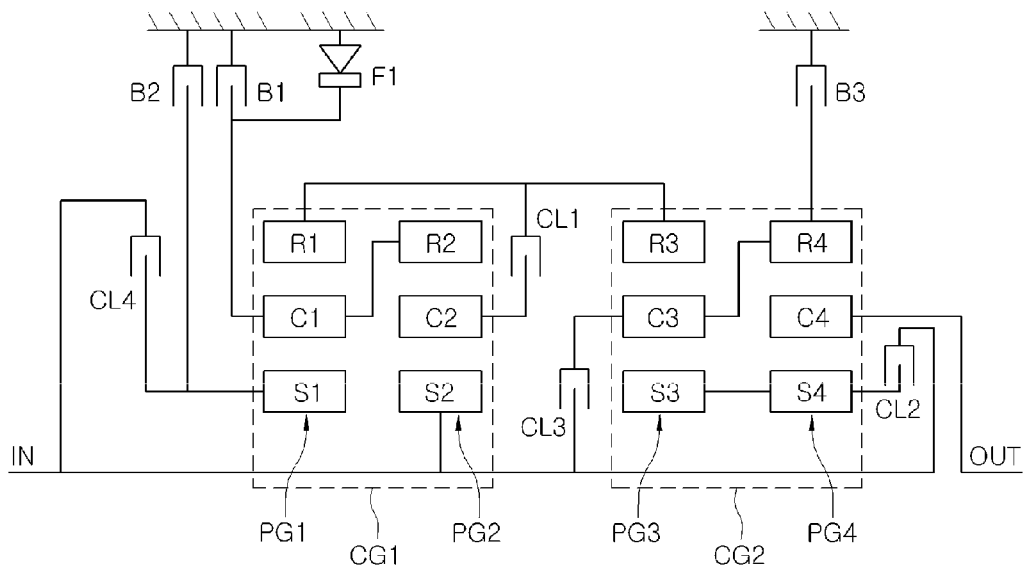
FIG. 1 shows a structure of an exemplary transmission for a vehicle according to the present invention.
FIG. 2 shows an operational chart of operating elements of the transmission of FIG. 1.

Reference will now be made in detail to various embodiments of the present invention(s), examples of which are illustrated in the accompanying drawings and described below. Wherever possible, the same reference numerals will be used throughout the drawings and the description to refer to the same or like parts.

While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
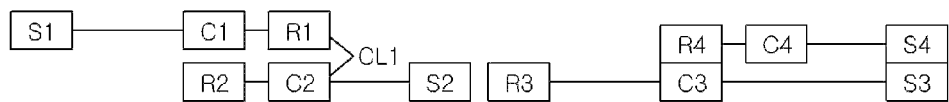
FIG. 3 is a lever diagram explaining the operation of the transmission of FIG. 1.
Figure 3:
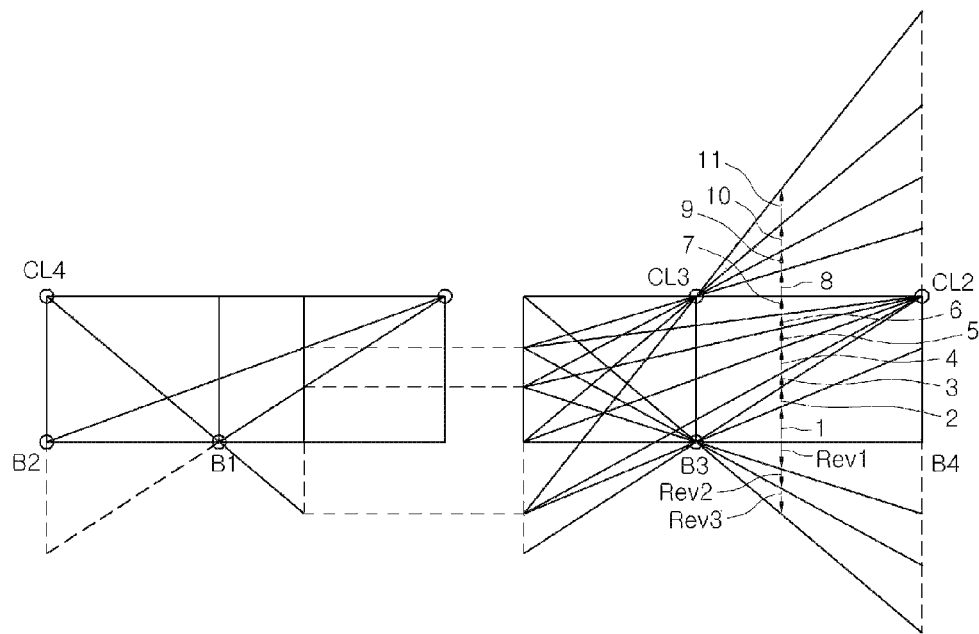

Referring to FIGS. 1 to 3, a transmission for a vehicle according to various embodiments of the present invention includes a first compound planetary gear train CG1 in which a first planetary gear train PG1 and a second planetary gear train PG2 are coupled to each other, a second compound planetary gear train CG2 in which a third planetary gear train PG3 and a fourth planetary gear train PG4 are coupled to each other and at least one rotational element thereof is connected with a rotational element of the first compound planetary gear train CG1, an input shaft IN which is connected to rotational elements of the first compound planetary gear train CG1 through at least two paths and is connected to rotational elements of the second compound planetary gear train CG2 through at least two paths, an output shaft OUT which is connected to one rotational element of the second compound planetary gear train CG2, first and second brakes B1 and B2, each of which locks the rotational elements of the first compound planetary gear train CG1, a third brake B3 which locks the rotational element of the second compound planetary gear train CG2, and a first clutch CL1 which selectively connects the rotational elements of the first and second planetary gear trains PG1 and PG2 to each other.

The input shaft IN is permanently connected to a first rotational element of the second planetary gear train PG2. The input shaft IN is selectively connected to a first rotational element of the third planetary gear train PG3 and a first rotational element of the fourth planetary gear train PG4 via a second clutch CL2. The input shaft IN is selectively connected to a second rotational element of the third planetary gear train PG3 via a third clutch CL3. The input shaft IN is selectively connected to a first rotational element of the first planetary gear train PG1 via a fourth clutch CL4.

Further, the output shaft OUT is connected to a second rotational element of the fourth planetary gear train PG4. A third rotational element of the first planetary gear train PG1 is permanently connected to the first rotational element of the third planetary gear train PG3. The first clutch CL1 is installed to selectively connect the third rotational element of the first planetary gear train PG1 and a second rotational element of the second planetary gear train PG2.

The first compound planetary gear train CG1 is configured to permanently connect the second rotational element of the first planetary gear train PG1 and the third rotational element of the second planetary gear train PG2 and to selectively connect the third rotational element of the first planetary gear train PG1 and the second rotational element of the second planetary gear train PG2 via the first clutch CL1.

The second compound planetary gear train CG2 is configured to permanently connect the first rotational element of the third planetary gear train PG3 and the first rotational element of the fourth planetary gear train PG4 and to permanently connect the second rotational element of the third planetary gear train PG3 and the third rotational element of the fourth planetary gear train PG4.

Herein, the first, second, and third rotational elements of the first planetary gear train PG1 are sequentially referred to as a first sun gear S1, a first carrier C1, and a first ring gear R1. The first, second, and third rotational elements of the second planetary gear train PG2 are sequentially referred to as a second sun gear S2, a second carrier C2, and a second ring gear R2. The first, second, and third rotational elements of the third planetary gear train PG3 are sequentially referred to as a third sun gear S3, a third carrier C3, and a third ring gear R3. The first, second, and third rotational elements of the fourth planetary gear train PG4 are sequentially referred to as a fourth sun gear S4, a fourth carrier C4, and a fourth ring gear R4.

Thus, in the first compound planetary gear train CG1, the first carrier C1 is permanently connected to the second ring gear R2, and the first ring gear R1 is selectively connected to the second carrier C2 via the first clutch CL1. When the selective connection is made by the first clutch CL1, the first compound planetary gear train CG1 is configured as a CR-CR type compound planetary gear train.

Further, in the second compound planetary gear train CG2, the third sun gear S3 is permanently connected to a fourth sun gear S4, and the third carrier C3 is permanently connected to the fourth ring gear R4. Thereby, the second compound planetary gear train CG2 is configured as a Simpson type compound planetary gear train.

Further, the input shaft IN is permanently connected to the second sun gear S2, is selectively connected to a connector between the third sun gear S3 and the fourth sun gear S4 via the second clutch CL2, is selectively connected to a connector between the third carrier C3 and the fourth ring gear R4 via the third clutch CL3, and is selectively connected to the first sun gear S1 via the fourth clutch CL4.

The output shaft OUT is connected to the fourth carrier C4, and the third ring gear R3 is permanently connected to the first ring gear R1.

The first brake B1 is installed so as to be able to selectively lock the connector between the first carrier C1 and the second ring gear R2. The second brake B2 is installed so as to be able to selectively lock the first sun gear S1. The third brake B3 is installed so as to be able to selectively lock the connector between the third carrier C3 and the fourth ring gear R4.

Further, to prevent the connector between the first carrier C1 and the second ring gear R2 from rotating in the reverse direction, a one-way clutch F1 is provided.

In the transmission for a vehicle configured as mentioned above according to various aspects of the present invention, the operation of the first to fourth clutches CL1 to CL4 and the first to third brakes B1 to B3 takes place as shown in the operational chart of FIG. 2. Thereby, the configuration of the transmission for a vehicle that was described above realizes forward 1-speed to 11-speed gear ratios and reverse 3-speed gear ratios. This operation is shown in a lever diagram of FIG. 3

As shown on the left side of FIG. 3, the first compound planetary gear train CG1 realizes two forward reduction ratios, one reverse reduction ratio, one step-up ratio, one 1:1 ratio, and one zero ratio. The second compound planetary gear train CG2 to which power shifted by this gear ratios realizes forward 11-speed and reverse 3-speed gear ratios as shown in the right side of FIG. 3.

For convenience in explanation and accurate definition in the appended claims, the terms left and right, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle comprising:
   a first compound planetary gear train in which a first planetary gear train and a second planetary gear train are coupled to each other;
   a second compound planetary gear train in which a third planetary gear train and a fourth planetary gear train are coupled to each other and at least one rotational element thereof is connected with a rotational element of the first compound planetary gear train;
   an input shaft which is connected to rotational elements of the first compound planetary gear train by at least two paths and is connected to rotational elements of the second compound planetary gear train by at least two paths;
   an output shaft which is connected to one rotational element of the second compound planetary gear train;
   first and second brakes, each of which locks the rotational elements of the first compound planetary gear train;
   a third brake which locks the rotational element of the second compound planetary gear train; and a first clutch which selectively connects the rotational elements of the first and second planetary gear trains to each other;

wherein the input shaft is permanently connected to a first rotational element of the second planetary gear train;

wherein the input shaft is selectively connected to a first rotational element of the third planetary gear train and a first rotational element of the fourth planetary gear train via a second clutch;

wherein the input shaft is selectively connected to a second rotational element of the third planetary gear train via a third clutch; and wherein the input shaft is selectively connected to a first rotational element of the first planetary gear train via a fourth clutch.

2. The transmission according to claim 1, wherein:

the output shaft is connected to a second rotational element of the fourth planetary gear train;

a third rotational element of the first planetary gear train is permanently connected to a first rotational element of the third planetary gear train; and the first clutch is installed to selectively connect the third rotational element of the first planetary gear train and a second rotational element of the second planetary gear train.

3. The transmission according to claim 1, wherein the first compound planetary gear train is configured so that a second rotational element of the first planetary gear train and a third rotational element of the second planetary gear train are permanently connected to each other, and a third rotational element of the first planetary gear train and a second rotational element of the second planetary gear train are selectively connected to each other via the first clutch.

4. The transmission according to claim 1, wherein the second compound planetary gear train is configured so that a first rotational element of the third planetary gear train and a first rotational element of the fourth planetary gear train are permanently connected to each other, and a second rotational element of the third planetary gear train and a third rotational element of the fourth planetary gear train are permanently connected to each other.

5. The transmission according to claim 1, wherein:

the first, second, and third rotational elements of the first planetary gear train sequentially correspond to a first sun gear, a first carrier, and a first ring gear;

the first, second, and third rotational elements of the second planetary gear train sequentially correspond to a second sun gear, a second carrier, and a second ring gear;

the first, second, and third rotational elements of the third planetary gear train sequentially correspond to a third sun gear, a third carrier, and a third ring gear;

the first, second, and third rotational elements of the fourth planetary gear train sequentially correspond to a fourth sun gear, a fourth carrier, and a fourth ring gear;

the first compound planetary gear train is configured as a CR-CR type compound planetary gear train when the first carrier is permanently connected to the second ring gear and when the first ring gear is selectively connected to the second carrier via the first clutch.

6. The transmission according to claim 5, wherein:

the second compound planetary gear train is configured as a Simpson type compound planetary gear train when the third sun gear is permanently connected to the fourth sun gear and when the third carrier is permanently connected to the fourth ring gear; and the third ring gear is permanently connected to the first ring gear.

7. The transmission according to claim 6, wherein:

the input shaft is permanently connected to the second sun gear, is selectively connected to a connector between the third sun gear and the fourth sun gear via the second clutch, is selectively connected to a connector between the third carrier and the fourth ring gear via the third clutch, and is selectively connected to the first sun gear via the fourth clutch; and the output shaft is connected to the fourth carrier.

8. The transmission according to claim 7, wherein:

the first brake is installed so as to be able to selectively lock the connector between the first carrier and the second ring gear;

the second brake is installed so as to be able to selectively lock the first sun gear; and the third brake is installed so as to be able to selectively lock the connector between the third carrier and the fourth ring gear.

9. The transmission according to claim 7, further comprising a one-way clutch that prevents the connector between the first carrier and the second ring gear from rotating in reverse.

* * * * *